Oct. 3, 1967

J. R. A. POLLOCK ETAL

ACCELERATED BATCH PROCESS FOR THE FERMENTATION OF BREWERS WORT 3,345,179

Filed Nov. 26, 1963

Oct. 3, 1967 J. R. A. POLLOCK ET AL 3,345,179

ACCELERATED BATCH PROCESS FOR THE FERMENTATION OF BREWERS WORT

Filed Nov. 26, 1963 2 Sheets-Sheet 2

United States Patent Office 3,345,179

Patented Oct. 3, 1967

3,345,179

ACCELERATED BATCH PROCESS FOR THE FERMENTATION OF BREWERS WORT

James Richard Allan Pollock, Mount Merrion, Ireland, and Harold Frank Philip Webber, Chertsey, Surrey, England, assignors to Arthur Guinness Son & Company (Dublin) Limited, a company of the Irish Republic Filed Nov. 26, 1963, Ser. No. 326,034

Claims priority, application Great Britain, Nov. 27, 1962, 44,795/62, 44,796/62; Jan. 24, 1963, 3,017/63

16 Claims. (Cl. 99—31)

ABSTRACT OF THE DISCLOSURE

Batch fermentation of brewers wort is accelerated by modifying the traditional batch process conditions so that the wort is aerated with from 3 milligrams to 150 milligrams per litre of oxygen; the yeast is pitched at a high concentration from 10 grams to 60 grams per litre (assuming 80% water content); the batch is continuously stirred, and traditional temperatures from 40° F. to 75° F. are employed. The oxygen content of the wort is adjusted to ensure that yeast growth in the shortened fermentation period resulting from this process, is nevertheless comparable with the yeast growth in the traditional process, since this factor is decisive in determining flavor.

This invention relates to the fermenation of brewers wort, and is concerned with an improved intermittent and preferably cyclic process for the production of potable beer, analogous in some ways to the traditional batch process, but capable of operating at a much higher rate. It should be understood that the term "beer" used throughout this specification means the potable product of fermentation of brewers wort by appropriate yeasts. When describing specific kinds of beer as necessary, appropriate terms such as ale, lager beer (lager), stout and porter will be employed.

In the production of potable beer by any process, one essential phase is the bringing together of brewers wort and yeast in conditions such that sugars in the wort are converted to alcohol while the yeast grows and proliferates and in doing so consumes nutrients, notably amino acids, present in the wort.

Traditionally this fermentation process is carried out in individual batches usually at temperatures within the range 40° F. to 75° F. A vessel is charged with fresh wort and yeast, which is either specially grown (i.e. of laboratory culture origin) or which has been conserved from a previous fermentation. The addition of yeast is termed "pitching." It is a common practice to aerate the wort to provide an adequate supply of oxygen without which the yeast cannot multiply. The temperature chosen will be influenced by the strain of yeast employed, but higher temperatures will, in general, encourage a faster reaction.

In the traditional batch process it has been the normal practice to use flocculent yeasts, that is to say yeasts which to a greater or lesser extent tend (if left undisturbed in suspension in the wort) first to cohere together into flocs of varying sizes, and secondly, as these flocs grow, to settle out of the wort. Some yeasts tend to float; others to sink, but whichever they do, it results in a concentration of yeast either at the surface of the wort or in the bottom of the vessel. It will be readily understood that yeasts which are exceptionally flocculent are avoided, as they may lead to slow or incomplete fermentation.

As a broad generalization, the approximate yeast concentration in the wort which one would expect to find used at the time of pitching, in straightforward traditional batch brewing under average circumstances lies somewhere between 0.5 and 4.0 grams per litre, which avoids autolysis and hence the production of unpleasant flavours in the finished beer. It should be understood that the figure for yeast refers to pressed yeast (assumed to contain 80% by weight water). This initial ratio of yeast to wort is termed the "pitching rate."

As an equally broad generalization, it will be found that under normal traditional batch conditions, i.e. where the available supply of growth promoting nutrients (mainly nitrogenous substances and oxygen) are limited by what is available in the fixed quantity of wort in the vessel, the upper limit of concentration during the fermentation after the yeast has multiplied, is normally about 9 to 10 grams per litre in excess of the original pitching rate.

When the desired degree of attenuation has been substantially achieved, i.e. when fermentation has proceeded nearly to the point where the appropriate amount of sugar has been converted to alcohol and the yeast has consumed all the amino acids which will not be needed in the final beer, the contents of the vessel are, in traditional practice, transferred to settling vessels in which the yeast (if of a type which tends to sink) is sedimented, or from which yeast (if of a type which tends to float) is skimmed off. It is the common practice for some of the yeast so obtained to be used for starting up the fermentation of another batch while the remainder is disposed of as "surplus yeast." Traditional processes have seldom been operated by pitching every fresh batch with yeast of direct laboratory culture origin. The need to use a relatively low concentration of yeast in the traditional batch process makes it slow and the fermentation may take from three days, in the case of ales and stout, to three weeks or more in the case of lager, from start to finish. It also involves the inconvenience and difficulties of storing and maintaining in good condition that part of the separated yeast which is to be used for starting up further batches.

If the fermenting time can be shortened without detriment to the final beer, a substantial improvement in production will have been achieved.

By long experience, the brewer operating the traditional process is able to inter-relate the nature of his particular wort, the strain and characteristics of his yeast, the duration and temperature of his process, and the pitching rate employed, so as to secure both the desired degree of attenuation and the appropriate flavour in the product.

The flavour of the finished beer does not depend only upon the nature of the wort employed. To a large extent it is dependent upon the changes brought about by the metabolism of the yeast during its growth stage.

It is an object of the present invention to provide an accelerated batch process for the fermentation of brewers wort by means of yeast which may be completed in a much shorter period (by comparison) with the time normally required in the traditional batch process, without detriment to flavour.

It is a further object of our invention to provide an accelerated batch process which can be operated either as a repeating cycle in one vessel or as a series of cycles in several vessels, and which, if desired, can be halted between cycles for short periods, such as week-ends and holidays and without inconvenience.

According to the present invention there is provided, in a batch process for the fermentation of brewers wort, in which a batch of said wort is pitched with yeast, is agitated and is fermented at traditional temperatures, the improvement wherein said wort, throughout said fermentation, is provided with an oxygen content within the range 3 milligrams per litre to 150 milligrams per litre; the whole batch of said wort is, at the commencement of said fermentation, brought into contact with said yeast in a fermentation zone to form a suspension of yeast in wort at an initial concentration within the range 10 grams per litre to 60 grams per litre (related to a yeast having 80% water content); said yeast suspension is controllably agitated to an extent sufficient to secure and maintain said yeast finely divided and substantially uniformly distributed throughout said wort during the greater part of the fermentation period, and said fermentation is conducted at temperatures within the range 40° F. to 75° F., whereby the period required to ferment said wort to a desired degree of attenuation is reduced.

Our invention includes a process, when employed to produce a known type of beer, attenuated to a predetermined degree hitherto produced by the traditional batch process, and using the same starting materials, wherein, throughout said fermentation, said oxygen content of said wort is controlled, and the amount of fresh yeast grown in said fermentation zone is consequently controlled, to ensure that by the end of said shortened fermentation period, when said predetermined degree of attenuation has been reached, substantially the same amount of such fresh yeast has been grown as would have been grown during the longer fermentation period if the traditional batch process had been employed.

By the expression "settle" is meant that the yeast is allowed to flocculate and separate out from the beer. In most cases it will sink to the bottom of the vessel, but certain yeasts may tend to float.

The stipulation that the mixture must be sufficiently agitated to secure and maintain a finely divided and substantially uniformly distributed suspension of yeast in and throughout the wort during the greater part of the fermenting period, means in practice that the agitation must serve to keep substantially all the yeast in contact with nutrient throughout the fermentation period until the time comes to arrest agitation and deliberately to permit the yeast to settle out of suspension in the beer. Mechanical stirring is our preferred method of agitation, because it allows easy adjustment of the stirring rate, which may have to be changed from one batch to another, dependent upon the particular combinations of wort and yeast used, for example when changing from the production of one kind of beer to another. The degree of agitation required for any particular combination of wort and yeast may readily be found by experiment. Preferably the agitation is relatively slow, steady and continuous, but in some cases it may be halted for short periods without harm to the process, provided that the yearst is not thereby allowed to flocculate and settle out of the suspension. It is the idle outlying yeast which has settled out during the traditional process, that is most liable to autolysis and the production of unpleasant flavours.

Moreover, the controlled agitation in our process enables us, if we so desire, to employ more highly flocculent yeasts than have hitherto been used by themselves in the traditional unstirred batch process. Brewers have naturally tended to avoid highly flocculent yeasts, even if they possessed other qualities which made them attractive, because of this fear of autolysis. Occasionally certain species of more highly flocculent yeasts have been found desirable for some particular fermentation, in which case they would normally have been used in relatively small proportions, mixed with yeasts of lower flocculence. Not only can our process employ highly flocculent strains of yeast where these are desirable, but their employment also further reduces the total time of fermentation of any batch, because the time taken for the yeast to settle out of the beer at the end of fermentation, is thereby reduced.

In our accelerated process, the initial high pitching rate, combined with controlled agitation, ensure a high rate of fermentation from the outset, since a large quantity of yeast is immediately made available for alcohol production throughout the wort. Because this high rate of fermentation persists throughout the duration of the process, the time taken to attain the desired degree of attenuation is materially reduced. We have found however, that if the inter-related control factors, particularly the oxygen available in the wort, are adjusted to ensure that the amount of yeast grown during this shorter period is substantially the same as would have been grown if the traditional method of fermentation had been employed, the flavour of the beer will be sufficiently close to that of beer made from the same materials by the traditional batch process.

In most cases our improved process will be employed for the production of established brands of beer, all of which are made from worts prepared in accordance with established methods in ways peculiar to the brewery of origin. Such beers have their own distinctive flavour. It is thus important to ensure, when brewing established brands of beer by our improved process, that the flavour of each such beer will be the same as that formerly made from the same wort by the traditional process.

Our invention accordingly also includes a process for producing, at an increased rate of production, a specific kind of beer having a characteristic flavour properties which is traditionally batch fermented from specifically prepared wort and selected yeast, which method comprises utilising the same types of wort and yeast and conducting the fermentation at a rate higher than that of the traditional batch process in the manner set forth above; the supply of oxygen, the temperature and the degree of agitation being so adjusted that when the desired degree of attenuation appropriate to that specific beer has been reached, the amount of yeast grown will have been substantially the same as would have been grown when brewing the same beer from the same materials by the traditional process, whereby the desired characteristic flavour properties of the beer are obtained.

Where regular production is required in the form of repeated cycles (as distinct from a single isolated batch, or from continuous chemostat conditions with continuous through-flow of materials) the process includes the step of immediately refilling the empty vessel with another fill of wort and thereafter repeating the cycle of fermentation, settling, emptying and refilling as often as required.

The invention therefore further includes the modification of our batch process for fermenting brewers wort with yeast, which is cyclic, and which includes the further step of utilising part of the separated yeast for pitching a further batch in the cycle.

It will be appreciated that although the process of this invention can usefully be employed to increase the speed of fermentation on a single isolated batch, its importance lies more in its application to a cycle of batches. For example, if a single vessel is operated cyclically with little or no intervals between batches, the output is materially increased over a long period of successive running. However, the main advantage of the process is realised when it is applied to a plurality of vessels, operating cyclically and at staggered time intervals so that, for example, one vessel is being filled, while others are concurrently at different stages of fermentation, while yet another is being emptied.

For greatest efficiency and maximum output, it is therefore a preferred feature of the invention to use a plurality of vessels operating cyclically and at staggered time intervals, the arrangement being such that a proportion of surplus yeast, derived from individual vessels as each completes its fermentation, is employed to pitch successive vessels as they are refilled.

If desired, the or each vessel may be emptied completely after fermentation, so that separation of yeast from beer takes place outside the vessel.

In one preferred form, the process is so arranged that after attenuation has been substantially achieved, agitation is arrested; the yeast is then permitted to settle to the bottom of the vessel and thereafter beer is withdrawn from the vessel in such manner as to leave behind a residue of settled yeast sufficient to pitch a fresh fill of wort to be subsequently introduced into the vessel. Alternatively, a plurality of vessels may be employed operating at staggered time intervals, some being emptied and pitched from residual yeast as above described, but at least one vessel being completely emptied so that it may be cleaned out and then freshly pitched, the arrangement being such that vessels can be cleaned out in series without interruption of the main flow of the cyclic process.

A cyclic batch process has already been suggested in U.S. Patent No. 3,207,605, which comprises placing a predetermined quantity of yeast in a vessel and adding a stream of wort at a controlled rate; thereafter subjecting the accumulating mixture to sufficient agitation to maintain the yeast evenly dispersed through the wort, the unfermented wort accumulating at such rate that at the end of a predetermined time the body of fermenting wort is fermented to a desired degree of attenuation, at least a major part of the fermented wort being thereafter separated from the yeast. That process is said to be carried out preferably under conditions such that the fermentation stage is completed in about sixteen hours, so that a batch of beer may be produced each working day. In the accumulating batch process, the addition of wort continues throughout the whole of the fermentation period. Whereas in the said accumulating batch process it was recognized that an accelerated fermentation can be achieved by a higher concentration of yeast, provided steps are taken by agitation to ensure that the yeast is not exposed to the risk of autolysis, this process nevertheless still did not lead to the expected satisfactory result since the final product did not fully come up to the required flavour. Partly this may be due to the fact that, at least at the beginning, owing to the high initial concentration of the yeast in a relatively small volume of the wort some degree of autolysis took place. However, the unsatisfactory result appears to have been principally due to the fact that it had not yet been recognized, as in the present invention, that the flavour of the final product is decisively co-determined by the quantity of the yeast which is freshly formed during fermentation, whereas the fermentation time is principally determined by the existing concentration of the yeast. Both factors must therefore be suitably adjusted to ensure a satisfactory result. In the accumulating batch process it is in practice difficult to regulate the quantity of yeast which actually forms as accurately as would be required so that the chemical events which functionally depend upon the growth of the yeast remain too indeterminate.

Continuous processes for fermenting brewers wort have been proposed. These operate on the chemostat principle, as distinct from the batch principle of our improved process, that is to say they involve the use of one or more vessels, each containing a constant volume of wort and yeast in a state of fermentation, fresh unfermented wort being added continuously and wholly or partly fermented wort being withdrawn continuously. It has also been proposed to use a high yeast concentration and continuous agitation in such processes to maintain the yeast in dispersal in the wort. It is a characteristic of all such continuous processes that the contents of each vessel are under steady state conditions, i.e. there is no change with respect to time, in the content of sugar, of nitrogenous compounds, of acidity or of pH.

By contrast, in our improved process, each of the aforesaid characteristics varies with time during the course of the fermentation.

Moreover, the performance of continuous processes involves the provision of complicated accessory equipment. Another drawback of continuous processes is that they are open to the risk of infection and that if infection does occur, the closing down, sterilising and re-starting of a plant takes a long time—usually in the order of four weeks or more.

The achievement of a satisfactory flavour in the beer is a complex operation. We have found it helpful to use the traditional batch process as a basis of comparison. Much depends upon the nature and processing of the materials of which the wort is composed, but when comparing our improved process with the traditional process, the same wort can be used as a starting point. This is also true of the yeast.

In controlling the fermentation so as to produce beer of the desired flavour, it is important to compare the total amount of yeast grown per unit volume of wort as between the two processes. This total can be ascertained within limits of accuracy sufficient for production control, by yeast counts carried out at the beginning and end of the fermentation. It is known that a single measurement of yeast concentration, by taking one sample in a batch, is liable to error. Therefore, several such samples should be taken, and their average used for calculations.

Another indication of the amount of yeast grown is the fall in the nitrogen content of the wort, which is a reasonably accurate guide in average conditions. We have found that the combined use of a yeast count and a measurement of nitrogen levels will provide sufficient data to allow adjustment of our improved process adequate to control the amount of yeast grown during the fermentation so that it is the same as would have been grown during traditional fermentation of similar wort with similar yeast, so that a satisfactory flavour can be obtained in the final beer.

Assuming that an operator desires to reproduce the flavour of a known kind of beer, he can first ascertain the amount of yeast grown, per unit volume of wort fermented to a desired level of attenuation by the traditional process, noting the amount of oxygen present in the wort at the time of filling the fermenter vessel.

He should then carry out a similar trial in a stirred vessel at the higher yeast concentration of our improved process using the same wort and yeast, and the same temperature. When the attenuation reaches the desired level he should then ascertain whether the amount of yeast grown is greater or less than the amount grown under traditional conditions. If it is greater he should reduce the oxygen level in the wort at the time of filling; if, which surprisingly is often the case, the amount of yeast grown is less than in the traditional method, he should increase the oxygen level in the wort at the time of filling. We have found that in cases where increase of oxygen is required, it is more effective to oxygenate the wort initially rather than to add oxygen during fermentation, though in some cases this may prove satisfactory. Using such a procedure we have found the flavour of the product to be sufficiently near that of the known kind of beer, to require only small adjustments in the detail of the process to obtain a satisfactory reproduction of the known beer.

The basic equipment and the general method of operating the process of the invention are described hereafter with reference to the accompanying diagrammatic drawings in which.

Additionally, and in order to provide information regarding materials, pitch rate, control factors and other details, examples will be given of the cyclic batch brewing of various kinds of beer in a single vessel cyclic system as follows:

Example C1 and C2 describe examples of the brewing of ale.

Example D describes the brewing of lager.

Example E describes the brewing of stout.

Example F describes the brewing of porter.

Figure 1:
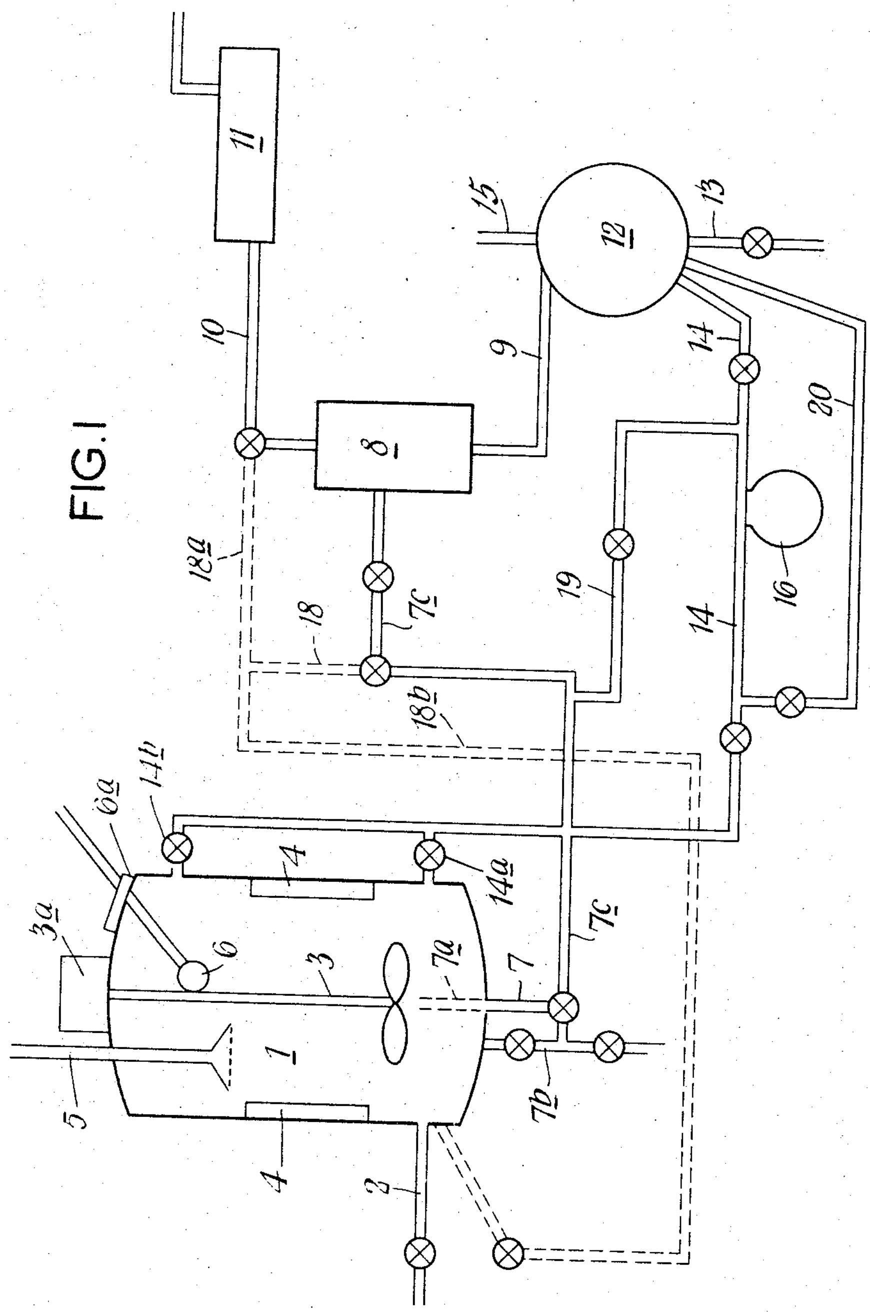
FIGURE 1 illustrates a typical arrangement of equipment suitable for operating a single vessel, which can produce either an isolated batch, or if run cyclically a succession of batches, as respectively described under Examples A1 and A2.

The apparatus illustrated in FIGURE 1 shows diagrammatically the basic equipment required for single vessel operation.

A fermenter vessel 1, which is normally closed and provided with appropriate venting arrangements (not shown), and which has a gas space in the head, is adapted to be supplied with wort by gravity or pumping through a wort inlet pipe 2 which preferably feeds into the base of the vessel. The vessel is provided with a controllable fan-type stirrer 3, driven, for example, by a variable speed electric motor 3*a*. Other conventional fittings are also provided as in the traditional batch brewing process, and these include internal cooling or attemperating coils which are illustrated diagrammatically as 4, and means for removing first heads together with extraneous amorphous matter and floating yeast, where required. For this purpose either a mechanical skimmer (not illustrated but conventional) can be used, or a suction skimmer as illustrated diagrammatically at 5. It will be understood that the suction skimmer 5 operates at the level of the surface of the wort when the vessel is filled. For cleaning the vessel, any conventional means may be used, and in this example a mechanical cleaning device is shown, comprising the sprayball 6, which is introduced through the manhole 6*a* at the top of the vessel.

An outlet pipe 7 is provided at the bottom of the vessel for withdrawing the contents at the end of fermentation. In the case where it is desired to leave a residue of yeast slurry in the bottom, for re-pitching a subsequent fill, this pipe 7 may be extended upwardly as at 7*a*, as shown in dotted lines, to form a standpipe. A draining pipe 7*b* is also provided in that case, for emptying the vessel completely when required. The pipe 7 is also linked through a pipe 7*c* with a separator 8. To separate the beer from the yeast it is preferred to use a centrifugal separator, illustrated only diagrammatically at 8, out of which beer from which yeast has been removed may be delivered through the pipe 10 into storage, passing if necessary through a cooler illustrated diagrammatically as 11.

Yeast slurry or sludge is discharged from the separator through an outlet 9 and may either be discharged as surplus yeast through pipe 9*a* or passed to a yeast-holding vessel 12, optionally provided with refrigeration means (not shown but conventional) and having a draw-off pipe 13 and a re-cycling pipe 14 for returning predetermined quantities of yeast to the fermenter vessel in cases where it is desired to use the yeast derived from a previous batch for pitching a successive batch. Such yeast may either be fed into the fermenter vessel through the inlet 14*a* for bottom pitching, or through the inlet 14*b* for top pitching. If desired, compressed air may be fed into the yeast holding vessel 12 through a pipe 15 for the purpose of transferring the yeast; alternatively a pump 16 may be employed for this purpose. It is to be understood that conventional valves and other similar fittings are employed as necessary. In some cases it may be desirable to mix a quantity of yeasty beer direct from the fermenter vessel with the yeast-free beer emerging from the separator. For this purpose a by-pass pipe 18 is provided, having a branch 18*a* communicating with the pipe 10. A further branch 18*b* is optionally provided for re-cycling yeasty beer in controlled quantities into the base of the vessel 1, where this is required. A by-pass pipe 19 connects the pipe 7*c* via pump 16 and pipe 20 with the yeast-holding vessel 12.

The operation of this single vessel equipment will now be described in Examples A1 and A2 which deal respectively with isolated batch operation and cycle batch operation when carried out in a single vessel.

It should be understood that these examples are confined only to the manner of using the equipment and are not intended to provide details of materials, times, temperatures etc. Such details are given in examples C to F which follow later.

EXAMPLE A1.—THE PRODUCTION OF A SINGLE ISOLATED BATCH

A fill of wort is fed into vessel 1 by means of pipe 2, and is pitched with yeast. Stirring under controlled conditions is begun as soon as the blades of the stirrer 3 are submerged; and is continued as necessary to maintain homogeneity and uniform dispersion of the yeast in the wort. Temperature control is provided by the attemperating coils 4. If it is desired to remove first heads the suction skimmer 5 is employed.

When the desired degree of attenuation has been reached stirring is stopped and the vessel is emptied. In the case of an isolated batch, the beer would be taken out from the bottom of the vessel through the pipe 7 and along pipe 7*c* to the separator 8, from which yeast-free beer emerges at 10 and yeast at 9. The beer is then available for conventional processing.

Upon emptying the vessel 1 it may then be cleaned by means of the sprayball 6 or in some other conventional manner. Washing liquor can be drained away through pipe 7*b*.

EXAMPLE A2.—THE PRODUCTION OF A REPEATED CYCLE OF BATCHES IN A SINGLE VESSEL

The initial filling and the fermentation of the first batch are carried out as in the case of the isolated batch, Example A1. When the desired degree of attenuation has been reached stirring is stopped, and the vessel is emptied. In the case where it is desired to re-pitch with residual yeast from a previous batch, the yeast is given time to settle to the base of the vessel (or to float to the top of the beer). Beer is then drawn off through a standpipe 7*a* and pipes 7 and 7*c*, so that a predetermined volume of yeast slurry is left in the base of the vessel to the extent governed by the height of the standpipe, which conveniently is adjustable.

In the case where it is desired to empty and clean the vessel before it is being used again, one of two procedures may be used. In the first (which is preferred) the same method of operation is used as described in the last paragraph, but the yeast slurry remaining in the vessel is pumped off by way of pipes 7, 7*c* and 19 and pump 16 and pipe 20 to the yeast-holding vessel 12, whence it is returned to the vessel 1, after the vessel has been washed, cleaned and if desired, sterilised.

In the alternative method of operation, the whole of the contents of the vessel are drawn off by way of pipes 7 and 7*c* to the separator 8 whence the yeast is transferred to the yeast-holding vessel 12, from which it is to be returned to the vessel 1 when this vessel has been cleaned as desired.

The next fill of wort is then introduced, and the pitching rate is determined by relating the volume and approximate yeast count of the residual slurry to the volume (and yeast count if the wort has been already partly pitched) of the new fill of wort.

Even though a yeast count cannot be carried out with close numerical accuracy, the skilled brewer will be able to adjust the above relationship without difficulty, comparing results of trial batches.

Figure 2:
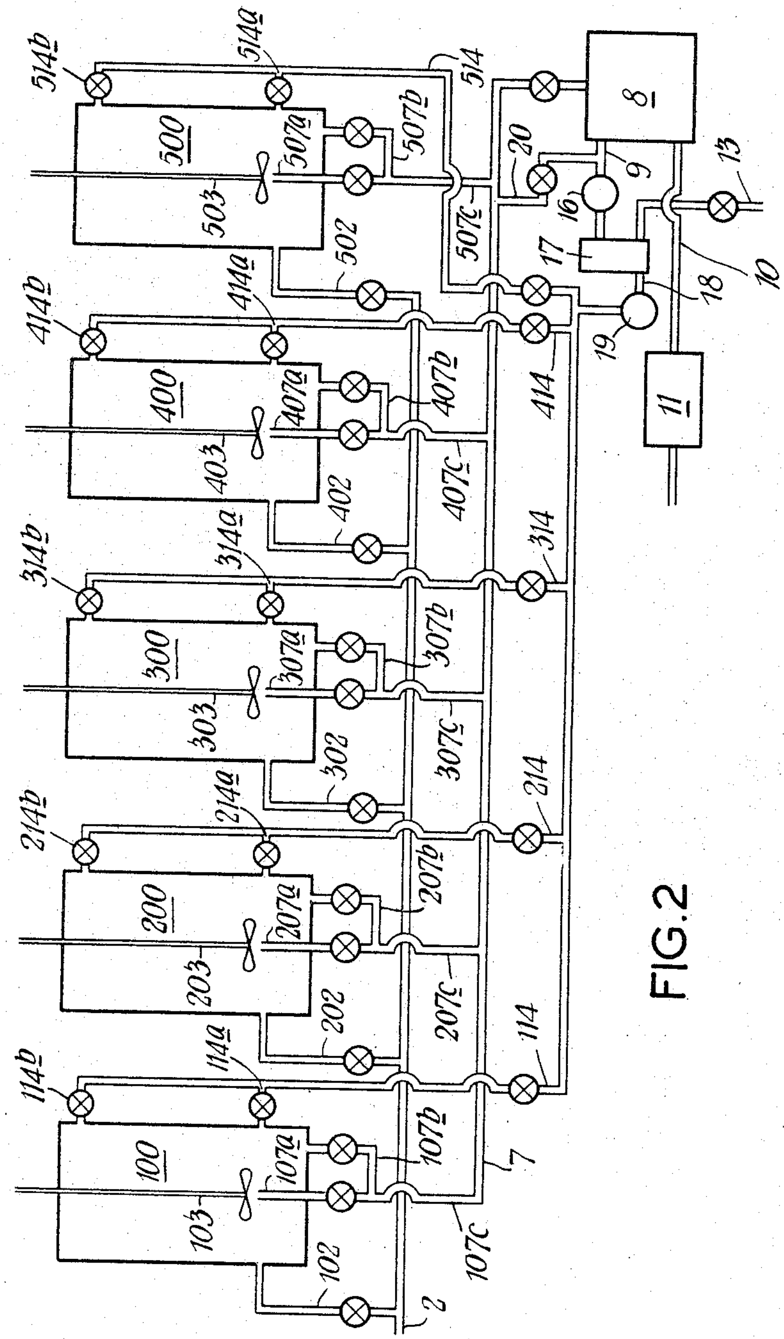
FIGURE 2 illustrates a typical arrangement of equipment suitable for cyclic operation, utilizing a plurality of vessels operating at staggered time intervals, as described under Example B.

The apparatus illustrated in FIGURE 2 shows diagrammatically the equipment required for multiple vessel operation, which is preferably carried out at staggered time intervals in successive vessels for maximum economy. Five vessels are shown. In the example described, four of these will be in use at any one time while the fifth is available for cleaning. Obviously the number of vessels and the order of their use is variable according to the particular requirements in any brewery.

For simplicity, in the description and drawing of FIGURE 2, only those parts of the equipment necessary to explain cyclic operation have been shown. It should be understood that the equipment described in relation to the single vessel of FIGURE 1 is equally applicable to multiple vessel working.

In FIGURE 2, five vessels 100, 200, 300, 400 and 500 are provided. These are fed with wort from a common wort inlet 2, through branch pipes 102, 202, 302, 402 and 502. Each vessel is provided with a stirrer, 103, 203, 303, 403 and 503.

A main outlet pipe 7 is connected by branches **107*c*, 207*c*, 307*c*, 407*c* and 507*c* to the respective vessels. These branches extend upwardly to form standpipes 107*a*, 207*a*, 307*a*, 407*a* and 507*a* within the respective vessels, which also have drainage branch pipes 107*b*, 207*b*, 307*b*, 407*b* and 507*b* which are connected to the main outlet pipe 7** and are used when any vessel has to be emptied completely, e.g. for cleaning.

The outlet pipe 7 communicates with a common centrifugal separator 8 from which yeast-free beer can be passed, via pipe 10 to a refrigerator 11, and thence to storage. If an increased separator capacity is required more than one separator can be employed.

From the separator 8 emerges a pipe 9 for yeast slurry which communicates, through pump 16, with a yeast-holding vessel 17. This vessel has an outlet pipe 13 for surplus yeast and communicates by way of pipe 18, pump 19 and branch pipes 114, 214, 314, 414, 514 with the several fermenting vessels, either at the base through inlets **114*a*, 214*a*, 314*a*, 414*a* or 514*a* or the top through inlets 114*b*, 214*b*, 314*b*, 414*b* and 514*b*. A pipe 20 connects pipe 7 directly with pipe 9**.

The operation of this multiple vessel equipment will now be described broadly, in example B which follows, giving only sufficient detail to explain the essential features of cyclic operation.

EXAMPLE B.—CYCLIC OPERATION WITH FIVE VESSELS

In this example it will be assumed that the following times are entailed in the various phases of the process which go to make up one batch in the cycle:

| | Hours |
|---|---|
| Filling the vessel with wort | 2 |
| Fermentation | 15 |
| Settling of yeast in vessel | 1 |
| Emptying the vessel | 2 |
| Total time for cycle | 20 |

If the total time of the cycle is twenty hours and if four of the five vessels are run at staggered intervals of five hours, each vessel can conveniently be run for a required number of successive cycles and can then be withdrawn from service for cleaning at which time the fifth vessel, which will just have been cleaned, can rejoin the cycle of operation. It is unlikely that cleaning will occupy the full twenty hours of the cycle but to withdraw a vessel for a complete cycle period gives ample time for maintenance. However, if necessary a vessel can be withdrawn from service indefinitely.

Assuming that each vessel in service is required to complete at least four cycles before it is cleaned, then when vessel 100 has completed three cycles and has just been emptied through standpipe **107*a*, so that it has a residue of yeast slurry from a previous batch, lying in the bottom of the vessel, it will be ready for re-filling to start its fourth cycle. With a cycle time of twenty hours and with the four vessels operating at the staggered intervals of five hours, when vessel 100 is starting its fill, at the beginning of its fourth cycle, vessel 200 will have completed thirteen hours of fermentation on its third cycle, vessel 300 will have completed eight hours of fermentation in its second cycle, vessel 400 will have completed three hours of fermentation in its first cycle, and vessel 500 will be cleaned and serviced and ready to return to the cycle of operation when required. As vessel 100 completes its fourth cycle it can be withdrawn from service for cleaning and replaced, if necessary, by vessel 500. Similarly, as each vessel completes its required number of cycles and is in need of cleaning and servicing, it will be withdrawn and replaced by the vessel that has just been cleaned and serviced. Thus vessel 200 can be withdrawn and replaced by vessel 100; vessel 300 will be withdrawn and replaced by vessel 200; vessel 400 will be withdrawn and replaced by vessel 300; vessel 500 will be withdrawn and replaced by vessel 400**.

EXAMPLE C1.—THE MAKING OF ALE

*Starting the first batch*

30 barrels (4920 litres) of wort suitable for making ale and at an original gravity of 1037° (9.2° Plato) saturated with air and already pitched with a strain of brewery yeast suitable for brewing ale (in this example *Saccharomyces cerevisiae*) at a rate of 1.8 grams per litre was further pitched with the same yeast to bring the rate up to 6.0 grams per litre. A stirred fermentation was conducted at a temperature of 66.5° F. (19° C.). After 36 hours when the gravity of the wort had dropped to 1010.5° the stirring was stopped, the beer was chilled to 58° F. (14.5° C.) and the yeast was allowed to settle to the bottom of the vessel.

After a period of 8 hours beer was drawn off from the vessel in such a manner as to leave 3 barrels (492 litres) of yeast in the bottom of the vessel to form residue for subsequent pitching during cyclic operation. The beer so drawn off was then further processed in the traditional manner.

*Cyclic operation*

To the residue of 492 litres left behind in the vessel there was added 27 barrels (4428 litres) of similar wort already pitched with the same yeast at 1.8 grams per litre. The total estimated pitching rate was in the order of 10 grams per litre. The mixture was stirred and maintained at a temperature of 66°–67° F. (19–19.5° C.) until the gravity of the vessel had fallen to 1010.5° (2.7° Plato). Stirring was then stopped and the yeast again allowed to settle; after settlement 27 barrels (4428 litres) were again withdrawn and 3 barrels (492 litres) were left behind as residue to start the next cycle.

This cycle was repeated in all three times.

The average time of fermentation was 25.3 hours as compared with 58 hours for traditional batch fermentation of similar wort with similar yeasts.

*The product*

The beer drawn off from the third batch in the cycle was conditioned, chilled and placed in storage in the normal manner. A quantity of the product was sold commercially as draught ale and there was no comment or complaint.

EXAMPLE C2.—THE MAKING OF ALE

*The trial batch*

60 barrels (9840 litres) of wort suitable for making ale containing from 8 to 10 mg. per litre of oxygen and at an original gravity of 1033.3 (8.2° Plato) were pitched with a strain of brewery yeast suitable for brewing ale (in this example *Caccharomyces cerevisiae*) at a rate of 10 grams per litre. The temperature of the wort at pitching was 60° F.

After filling the vessel half the contents (30 barrels, 4920 litres) were transferred to a second vessel and the two fermentations proceeded in parallel. A stirred fermentation was conducted at a temperature between 58° F. and 64° F. (14.5 and 18° C.).

After 38 hours the gravity had dropped to 1007.7° (1.9° Plato) and after 43 hours it had further dropped slightly to 1007.2°.

The vessels were then emptied and the beer drawn off through a centrifugal separator. The vessels were cleaned ready for re-use.

*Cyclic operation*

56.3 barrels (9225 litres) of wort at an original gravity of 1033.3 (8.2° Plato) containing from 8 to 10 mg. per litre of oxygen were pitched at a rate of 10.8 grams per litre at 61° F. (16° C.). The mixture was stirred and maintained at a temperature not in excess of 68° F. (20° C.). After 30 hours the gravity had fallen to 1010.4. The vessel was then emptied and cleaned, the beer and yeast being separated through a centrifugal separator.

Yeast Y1 from this batch 1 was used to pitch the next batch 2 and the yeast Y2 from batch 2 was used to pitch the next batch 3 and so on up to batch 8. The essential details appear in the table below.

TABLE OF EXAMPLE C2.—CYCLIC OPERATION

| Batch | Yeast | Estimated pitching rate, grams/litre | Pitching temperature, ° F. | Attenuation (specific gravity) | Hours to attenuation |
|---|---|---|---|---|---|
| 1 | Normal brewery culture | 10.8 | 61 | 1010.4 | 30 |
| 2 | Y1 | 18 | 67 | 1009.0 | 21 |
| 3 | Y2 | 21 | 64 | 1009.5 | 22 |
| 4 | Y3 | 24 | 66 | 1010.0 | 20 |
| 5 | Y4 | 21 | 66 | 1009.2 | 19 |
| 6 | Y5 | 21 | 68 | 1009.8 | 19 |
| 7 | Y6 | 18 | 68 | 1010.1 | 19 |
| 8 | Y7 | 27 | 68 | 1009.6 | 15 |

In all cases in the above table the original gravity was 1033.3 (8.2° Plato) and each batch was about 56.3 barrels (9225 litres) in volume. Trial bottlings of ale from each batch were acceptable.

EXAMPLE D.—THE MAKING OF LAGER

*Starting the first batch*

8 barrels (1312 litres) of wort suitable for making lager and at an original gravity of 1041° (1023° Plato) and having an oxygen content of 6 mg. per litre was pitched with a strain of brewery yeast suitable for brewing lager (in this example *Saccharomyces carlsbergensis*) at a rate of 4.0 grams per litre and a stirred fermentation was conducted at a temperature of 11° C. (52° F.). After 48 hours, when the gravity of the wort had dropped to 1012° the stirring was stopped and the yeast was allowed to settle. That small part of it which floated to the top of the vessel was removed by skimming.

Then the beer was drawn off from the vessel in such a manner as to leave 1 barrel (164 litres) of yeast slurry in the bottom of the vessel. This slurry was removed and conserved for pitching during cyclic operation. The beer drawn off was passed to a conditioning tank. The vessel was then cleaned.

*Cyclic operation*

8 barrels (1312 litres) of similar wort were placed into the cleaned vessel. The estimated pitching rate was about 9 grams per litre. The mixture was stirred and maintained at a temperature of 11° C. (52° F.) until the gravity of the vessel had fallen to about 1008.5–1011° (2.1–2.8° Plato). Stirring was then stopped and the yeast again allowed to settle; and the yeast on the surface was removed by skimming. After settlement the full amount of supernatant beer (7 barrels, 1148 litres) was again withdrawn and 1 barrel (164 litres) of yeast slurry also withdrawn and retained to pitch the next cycle, which was commenced after the vessel had been cleaned.

This cycle was repeated in all 20 times.

The average time of fermentation was 48 hours as compared with 144 hours for traditional batch fermentation of similar wort with similar yeasts.

*The product*

The beers drawn off from the 19th and 20th batches in the cycle were conditioned, chilled, filtered, carbonated and bottled in the manner conventionally used for traditionally brewed lager.

The resulting product, though not identical in flavour with traditionally brewed lager from the same wort and yeasts, was nevertheless considered by a tasting panel to be within the acceptable range of normal commercial lagers.

EXAMPLE E.—THE MAKING OF STOUT

*Starting the first batch*

131 barrels (21,484 litres) of wort at 60° F. suitable for making stout and at an original gravity of 1045° (11° Plato) was treated with oxygen (5% by volume) and was then pitched with a strain of brewery yeast suitable for brewing stout (in this example *Saccharomyces cerevisiae*) at a rate of 0.6 gram per litre and a stirred fermentation was conducted. After 28 hours, when the gravity of the wort had dropped to 1010–1011° (2.6–2.8° Plato) the stirring was stopped and the yeast was allowed to settle to the bottom of the vessel.

After a period of four hours beer was drawn off from the vessel in such a manner as to leave 5 barrels (820 litres) of yeast slurry in the bottom of the vessel to form residue for subsequent pitching of the next batch during cyclic operation. The beer drawn off was passed through a centrifugal separator to separate the yeast from the beer.

*Cyclic operation*

To the residue of 5 barrels (820 litres) left behind in the vessel there was added 85 barrels (13,940 litres) of similar wort at 64° F. The estimated pitching rate was in the order of 18 grams per litre. The mixture was stirred continuously until the gravity of the vessel had fallen to 1010–1011° (2.6–2.8° Plato). Stirring was then stopped and the yeast again allowed to settle; after settlement 85 barrels (13,940 litres) were again withdrawn and 5 barrels (820 litres) were left behind as residue to start the next cycle. The beer withdrawn was again separated by centrifuging.

This cycle was repeated in all 6 times with varying quantities of added wort.

The times of fermentation for the individual batches were as shown in the table, as compared with 60 hours in the traditional batch process for fermentation of similar wort with similar yeasts.

TABLE OF EXAMPLE E.—CYCLIC OPERATION

| Batch No. | Volume of added wort | | Estimated pitching rate (g./l.) | Pitching temperature (° F.) | Time (Hr.) for gravity to reach 1010–1011° |
|---|---|---|---|---|---|
| | Barrels | Litres | | | |
| 1 | 131 | 21,484 | 0.6 | 60 | 28 |
| 2 | 90 | 14,760 | 18 | 64 | 18 |
| 3 | 100 | 16,400 | 16 | 64 | 18.5 |
| 4 | 110 | 18,040 | 15 | 64 | 19 |
| 5 | 80 | 13,120 | 20 | 68 | 8 |
| 6 | 90 | 14,760 | 18 | 62 | 16 |

*The product*

The beers drawn off from the successive batches in the cycle were collected in a storage vessel and samples of the mixed beers were drawn off from time to time, and were further prepared in conventional manner as naturally conditioned stout.

The resulting samples of stout were compared, by a tasting panel, with naturally conditioned stout made from similar worts by the traditional batch process. They were found to be indistinguishable.

EXAMPLE F.—THE MAKING OF PORTER

*Starting the first batch*

80 barrels (13,120 litres) of wort suitable for making porter and at an original gravity of 1034° (8.4° Plato) was treated with oxygen (5% by volume) injected during 3 hours and was then pitched with a strain of brewery yeast suitable for brewing porter (in this example Saccharomyces cerevisiae) at a rate of 1.5 grams per litre, and a stirred fermentation was conducted at a temperature of 70° F. After 41 hours, when the gravity of the wort had dropped to 1010° (2.6° Plato) the stirring was stopped and the yeast was allowed to settle to the bottom of the vessel.

Beer was drawn off from the vessel and passed through a centrifugal separator to separate the yeast from the beer. The yeast was then returned to the fermenting vessel.

*Cyclic operation*

To the yeast returned to the fermentation vessel there was added 13,120 litres of similar wort treated with oxygen (5% by volume). The estimated pitching rate was about 7 grams per litre. The mixture was stirred and maintained at a temperature of 70° F. until the gravity of the wort had fallen to 1020° (5.0° Plato) the beer was drawn off and passed through a centrifugal separator to separate the yeast from the beer. The yeast was returned in appropriate quantity to the fermentation vessel and further wort added to start the next cycle. This cycle was repeated in all twenty-two times, the final gravity being between 1011° and 1016.5° (2.8–4.1° Plato) as shown in the table below. The time of fermentation varied from 16 to 19 hours as compared with 50 hours for traditional batch fermentation of similar wort with similar yeast. The average quantity of yeast produced (as estimated by a comparison of the number of cells in a given volume at the start and end of a batch), was 10 grams per litre, as in a traditionally conducted fermentation of the same porter wort with the same yeast.

TABLE OF EXAMPLE F.—CYCLIC OPERATION

| Batch No. | Estimated pitching rate (g./l.) | Temperature (° F.) | Time of fermentation (hr.) | Gravity at end (°) |
|---|---|---|---|---|
| 1 | 1.5 | 70 | 41 | 1010 |
| 2 | 7 | 70 | 16 | 1020 |
| 3 | 16 | 70 | 16 | 1011 |
| 4 | 20 | 70 | 16 | 1011 |
| 5 | 20 | 70 | 16 | 1011 |
| 6 | 15 | 67.5 | 16 | 1011 |
| 7 | 10 | 66 | 16 | 1015.5 |
| 8 | 10 | 66.5 | 16 | 1016.5 |
| 9 | 18 | 68.5 | 16 | 1012.5 |
| 10 | 20 | 68.5 | 16 | 1014 |
| 11 | 25 | 69.5 | 19 | 1011.5 |
| 12 | 20 | 69.5 | 16 | 1011.5 |
| 13 | 20 | 69.5 | 16 | 1014.5 |
| 14 | 20 | 69 | 18 | 1014.5 |
| 15 | 15 | 70.5 | 16 | 1013.5 |
| 16 | 18 | 69/71.5 | 17 | 1012.5 |
| 17 | 28 | 66 | 16 | 1011 |
| 18 | 30 | 66 | 16 | 1011.5 |
| 19 | 20 | 66 | 16 | 1011.5 |
| 20 | 20 | 66 | 16 | 1012 |
| 21 | 20 | 69.5 | 16 | 1012 |
| 22 | 20 | 65.5 | 16 | 1011.5 |
| 23 | 20 | 65 | 16 | 1012 |

*The product*

The beers drawn off from successive batches in the cycle were collected in a storage vessel and were further prepared and blended with stout in conventional manner to make porter.

The resulting porter was approved by a tasting panel, and samples were sold commercially alongside porter made from similar wort by the traditional batch process. No complaints were received and it is to be assumed that the two products were indistinguishable.

It is to be understood that the examples described above may be varied in numerous ways without departing from the broad principles of this invention. In particular, the several control factors are independently variable although they interact with each other. In our process, yeast concentration, yeast growth and rate of fermentation are capable of being varied by adjusting more than one control factor which gives extreme flexibility.

At the time of first filling a completely empty vessel, the desired yeast concentration is quite simply achieved by introducing predetermined amounts of yeast and wort. When refilling, i.e. in cyclic operation the yeast can either by residual yeast from the previous batch or newly pitched yeast or a mixture of both. Where both yeast and wort are introduced they can be fed in together or separately. In especial cases, it may be desirable to pitch each successive batch with fresh yeast of laboratory culture origin if it is desired to minimize the risk of infection.

A wide range of pitching rates may be employed, from about 10 to 60 grams per litre, although we prefer to operate within the narrower range of 10 to 25 grams per litre.

The amount of yeast which is formed during the process is related, as discussed earlier, to the avialable nutrients in the wort and to the concentration of dissolved oxygen in the wort. According to the type of product desired, the oxygen content of the wort may be between 3 and 150 milligrams per litre and is preferably in the range 50 to 100 milligrams per litre when it is desired to match the flavour of beers hitherto produced by the conventional process.

As regards flocculence, the various strains of brewing yeasts have been separated by Gilliland (Wallerstein Laboratory communications, 1957, Volume 20 (March) page 41) into four classes. We find that yeasts of his Class II and Class III are suitable for use in our process. Yeasts of Class III are especially suitable when the method involves the use of a settled residue of yeast to pitch the next batch, though pure yeasts of this class are not normally satisfactory for traditional fermentation. Yeasts of Gilliland Class IV can also be used in our process.

Rate of fermentation is controlled not only by yeast concentration but by the extent of agitation and by the temperature. Variation of mechanical stirring is easily accomplished and may be supplemented or in some cases replaced by bubbling gas through the contents of the vessel. Normally $CO_2$ but in some cases nitrogen would be used for this purpose. Temperature control also affects the speed of fermentation. There is a tendency for temperature to rise particularly when fermentation is taking place with a high initial yeast concentration, and the temperature can be limited by cooling coils of conventional type.

We claim:

1. In a batch process for the fermentation of brewers wort, in which a batch of said wort is pitched with yeast, is agitated and is fermented at traditional temperatures, the improvement wherein said wort is provided with an oxygen content within the range 3 milligrams per litre to 150 milligrams per litre; the whole batch of said wort is, at the commencement of said fermentation, brought into contact with said yeast in a fermentation zone to form a suspension of yeast in wort at an initial concentration within the range 10 grams per litre to 60 grams per litre (related to a yeast having 80% water content); said yeast suspension is controllably agitated to an extent sufficient to secure and maintain said yeast finely divided and substantially uniformly distributed throughout said wort during the greater part of the fermentation period, and said fermentation is conducted at temperatures within the range 40° F. to 75° F., whereby the period required to ferment said wort to a desired degree of attenuation is reduced.

2. A process according to claim 1, when employed to match a known type of beer such as is produced by the traditional batch process, and wherein the types of wort and yeast are the same as those used for said known beer and the product is attenuated to the same predetermined degree as said known beer, and wherein said oxygen content of said wort is controlled, and the amount of fresh yeast grown in said fermentation zone is consequently controlled, to ensure that by the end of said shortened fermentation period, when said predetermined degree of atttenuation has been reached, substantially the same amount of such fresh yeast has been grown as would have been grown during the longer fermentation period if the traditional bath process had been employed.

3. A process accorrding to claim 1, wherein said initial yeast concentration lies within the range 10 grams per litre to 25 grams per litre.

4. A process according to claim 1, wherein said oxygen content of said wort lies within the range 85 milligrams per litre to 105 milligrams per litre.

5. A process according to claim 1, wherein said wort is aerated prior to being brought into contact with said yeast.

6. A process according to claim 1, wherein said wort is aerated during fermentation.

7. A process according to claim 1, wherein the said initial high yeast concentration is controlled by relating the predetermined residue of said yeast left in said fermentation zone after a previous fermentation, to the predetermined quantity of wort in said batch.

8. A process according to claim 1, carried out under enclosed conditions and at atmospheric pressure.

9. A process according to claim 1, in which said agitation of said suspension is performed mechanically by a stirring device.

10. A process according to claim 1, in which said agitation of said suspension is performed by passing carbon dioxide through said fermenting wort.

11. A process according to claim 1, in which said agitation of said suspension is performed by passing nitrogen through said fermenting wort.

12. A process according to claim 1, in which control of said temperature of said fermenting wort is primarily exercised by controlling the temperature of the incoming wort.

13. A process according to claim 1, wherein yeasts are used having a higher tendency to flocculence than those normally used singly in the traditional bath process.

14. A process according to claim 2, wherein the said initial high concentration of said yeast is controlled by initially introducing predetermined quantities of said yeast and said wort into said fermentation zone.

15. A process according to claim 14, wherein said wort and said yeast are introduced independently.

16. A process according to claim 14, wherein a mixture of said wort and said yeast is introduced.

References Cited

UNITED STATES PATENTS

| | | | |
|---|---|---|---|
| 3,207,605 | 9/1965 | Pollock | 99—31 |
| 3,234,026 | 2/1966 | Coutts | 99—31 |

A. LOUIS MONACELL, *Primary Examiner.*

D. M. NAFF, *Assistant Examiner.*